United States Patent Office 3,259,744
Patented July 5, 1966

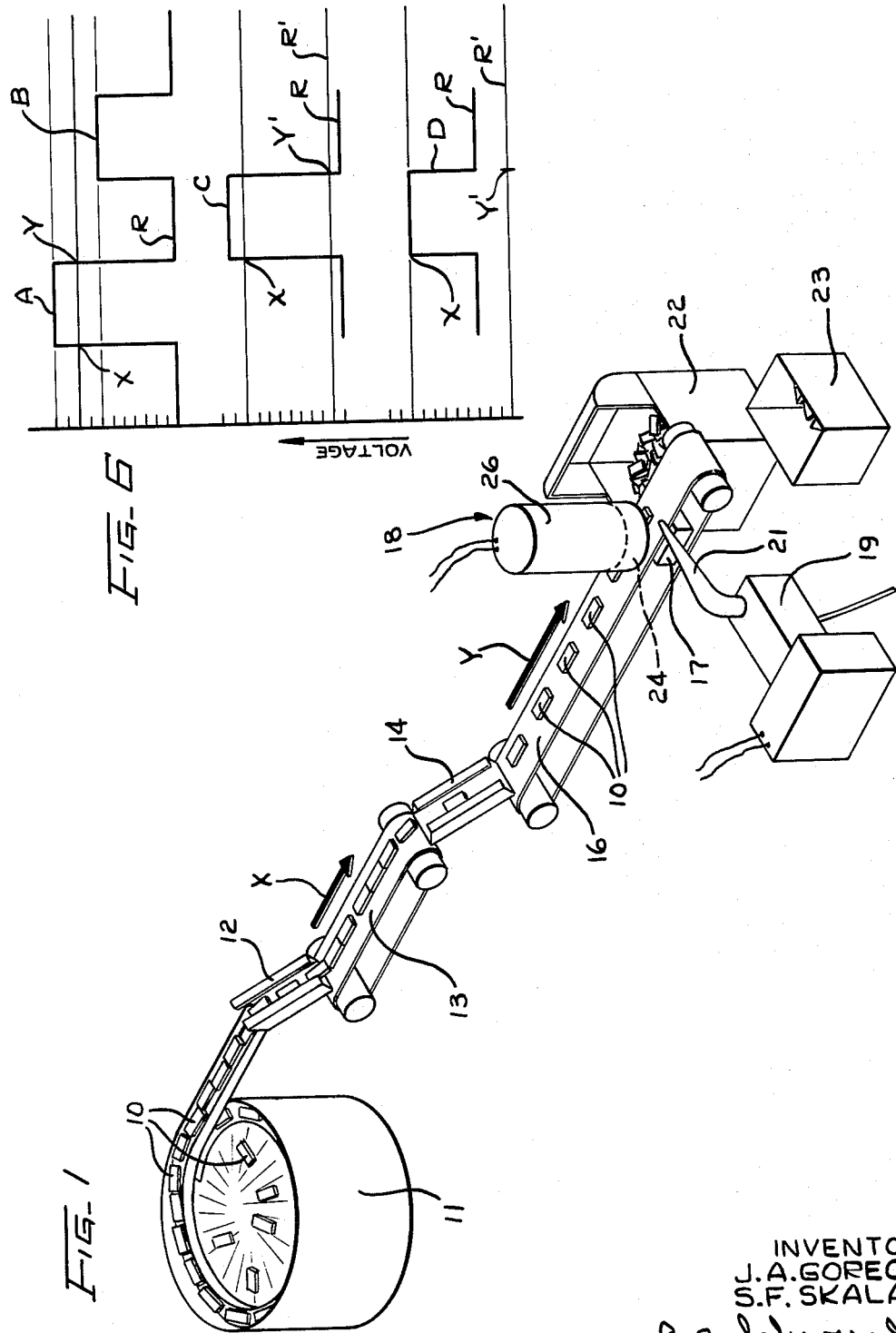

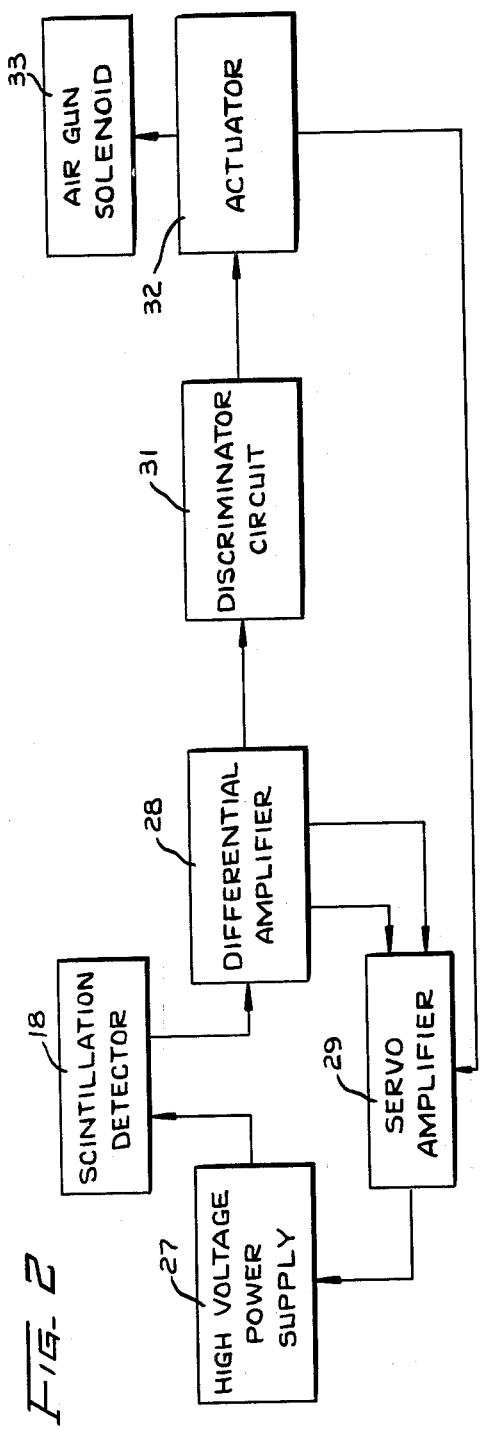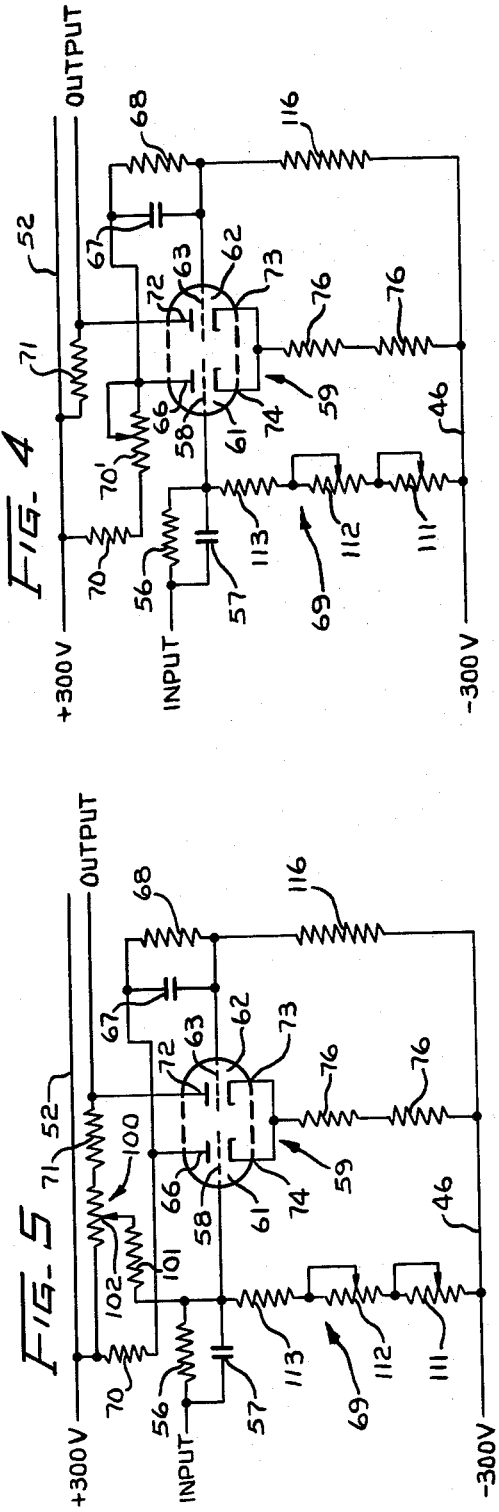

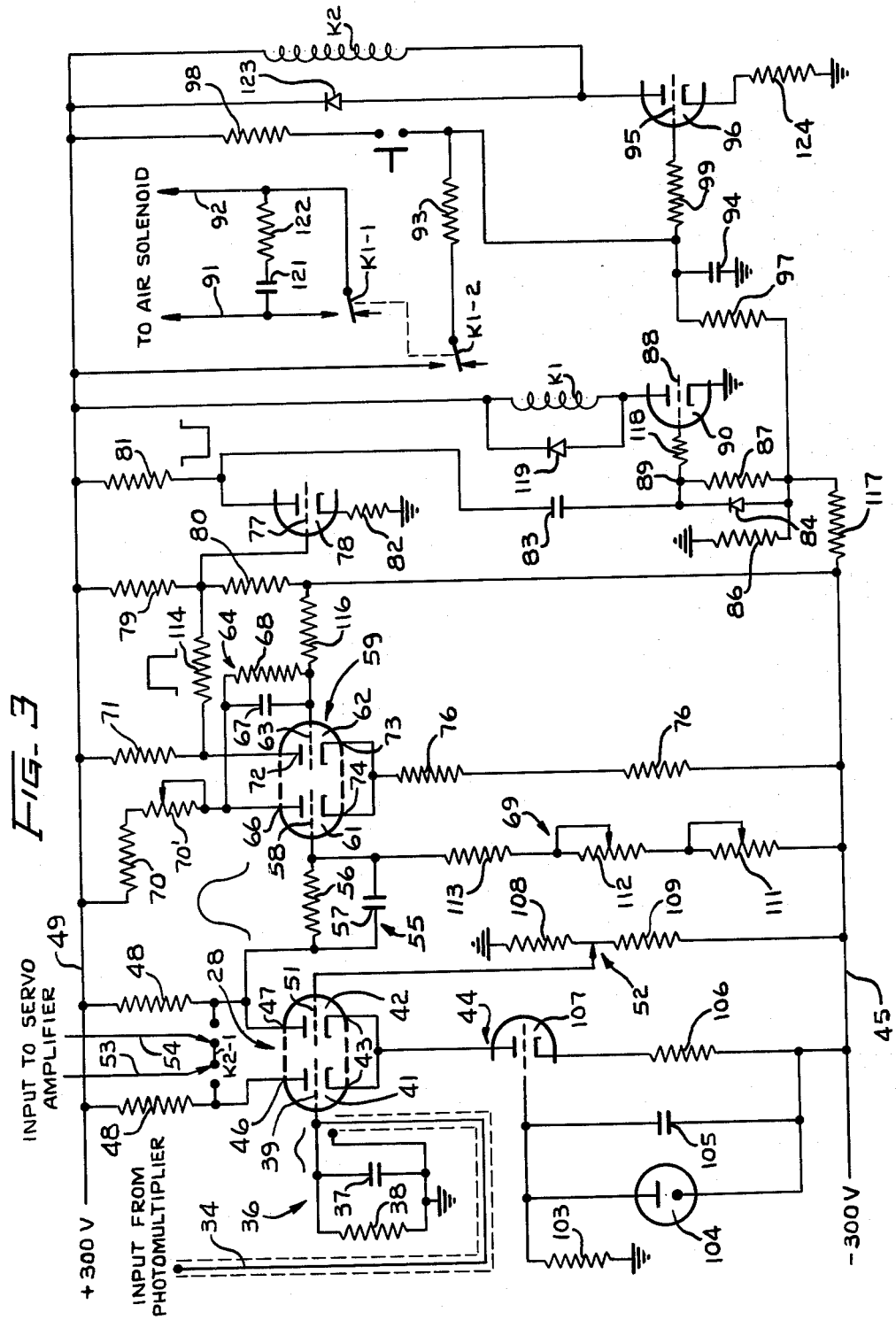

3,259,744
SIGNAL STABILIZED RADIATION MEASURING AND DISCRIMINATING APPARATUS USING A SCINTILLATION DETECTOR
John A. Gorecki, Chicago, and Stephen F. Skala, Glen Ellyn, Ill., assignors to Western Electric Company, Incorporated, New York, N.Y., a corporation of New York
Filed May 6, 1963, Ser. No. 278,074
16 Claims. (Cl. 250—71.5)

The present invention relates generally to signal-stabilized electrical signal-generating apparatus and to bilevel discriminator circuits. The invention further relates to a particularly advantageous combination of such signal-stabilized electrical signal-generating apparatus and bilevel discriminator circuits. The general objects of the invention are to provide new and improved apparatus and circuits of such character.

In this era of rapid technological advancement in the manufacturing arts, various industrial measurements are made with electronic equipment wherein a measured parameter is indicated by intelligence superimposed on a reference signal generated by a suitable signal source. Machines are even programmed by computers responsive to such signals, and consequently accuracy and reliability are of the essence. Such signal sources are often subject to drifting in the value of the reference signal, however, and hence the intelligence superimposed on the reference signal is distorted and the resulting measurement inaccurate.

It is, therefore, an object of the invention to provide new and improved signal-stabilized signal sources wherein drifting in the value of the reference signal is controlled so as to permit accurate measurements in industrial applications; and further to provide such signal sources in combination with bilevel discriminator circuits wherein drift in the value of the reference signal may be detected and a false output negated at times when the reference signal of the source cannot be stabilized for one reason or another.

The invention is particularly adaptable to radiation detection and discriminating equipment. Such equipment is enjoying widespread acceptance in manufacturing applications to facilitate many heretofore difficult if not impractical measurements. The most common application of such equipment relates to the ability of certain types of radiation to penetrate articles such that radiation passing through such articles provides an indication or measurement of a parameter of the article, for example, density, composition, thickness, etc. Whatever the parameter, the adaptability of radiation to measure or to indicate the same depends ultimately upon the dependability and versatility of the detection equipment and/or the discriminating equipment.

Accordingly, it is an object of the present invention to provide new and improved radiation measuring and discriminating apparatus which is dependable and versatile in analyzing a radiation flux for measurements in industrial applications.

There are a variety of commercially available radiation detector systems and discriminator circuits. Such detectors and discriminator circuits are generally utilized to generate and to discriminate, respectively, in terms of the absolute magnitude of signal. An unfortunate disadvantage in radiation detector systems is their susceptibility to drifting in the value of the output signal, resulting in improper indications and inaccurate discrimination.

It is, therefore, an object of the present invention to provide new and improved radiation measuring and discriminating apparatus wherein a reference signal is selectively monitored and drift in the value thereof controlled so as to provide a substantially constant reference signal and to permit accurate discrimination of absolute signal magnitudes. Another object of the present invention is to provide new and improved radiation measuring and discriminating apparatus wherein intelligence superimposed on a reference signal generated by a detector system is discriminated both for absolute pulse magnitude and for a selected value of reference signal.

Still another object of the invention is to provide signal-stabilized radiation measuring and discriminating apparatus for sensing variations in a radiation flux with respect to a normal level, wherein a reference signal of the detection system is monitored between variations in the flux and adjusted to control drifting in the value of the reference signal from a selected value corresponding to the normal level of flux intensity, and wherein the output signal from the detector system is discriminated during variations in the radiation flux with a first criterion of absolute magnitude and a second criterion of a selected value of reference signal.

In certain industrial applications, such as where rapid intermittent variations in a radiation flux are to be detected and responded to with negligible time delay, of the order of 10 milliseconds, many of the conventional detector systems are unsatisfactory for such purpose. For example, conventional ionization chambers have a slow response time and are inefficient. Such a detector also has an inherent resistor-capacitor time constant which has a best response time of 100 milliseconds. Geiger counters are also ineffectual for such purpose because the number of pulses that can be generated thereby, indicative of a radiation flux, is limited to one pulse at a time in response to a certain level of radiation and the detector is insensitive to radiation in excess of such level during the response time of such pulse. Specifically, when radiation initially causes ionization in a Geiger tube to effect a current pulse, a shield of ions is created which inhibits detection of further radiation until the Geiger tube attains its initial condition again.

Scintillation detector systems are capable of providing such a rapid time response since they may have a time constant of 1/4 microsecond. Scintillation detector systems are also continuously sensitive to radiation since they are capable of generating overlapping pulses indicative of the total radiation incident thereon, the number of pulses per unit of time being proportional to the intensity of the radiation. Thus, a reference signal may be established by averaging the number of pulses per unit of time produced in response to a normal level of radiation intensity, and intelligence signals may be established by a change in the number of pulses per unit of time produced in response to each intermittent variation in a radiation flux.

Scintillation detector systems have the same basic disadvantage common to most detector systems, however, in that the reference signal established by such output pulses is prone to drift away from the selected value. Theoretically, this drift is inherent in such detector systems and results from variations in the temperature and environment of the system, with aging of the components or source, moisture in the crystal, and dirt in the system also constituting contributing causes. In order for a scintillation detector system to be effective in measuring variations in a radiation flux, therefore, it is necessary that the detector output signal be stabilized with a substantially constant reference value.

Accordingly, more specific objects of the invention are to provide new and improved scintillation detector systems wherein a reference portion of the signal generated by the system is monitored to maintain the reference signal at a selected value, thereby to control drift in the reference signal of the detector system.

A further object of the invention is to provide a signal-stabilized scintillation detector system for detecting intermittent variations from a normal radiation flux intensity, wherein a reference signal, generated by the detector system in response to the normal level of flux intensity, is monitored between intermittent variations such that the reference signal may be maintained at a selected value to control drifting of the reference signal.

Conventional pulse-height discriminator circuits generally provide an output pulse in response to an input signal attaining a selected absolute magnitude. A basic disadvantage of such discriminator circuits is that an input signal may frequently attain the selected absolute magnitude as a result of drift in the reference level thereof, and thus an output pulse is provided for a false input signal. Though discriminator circuits have been known for several years, no prior art solution to the above problem has been forthcoming; thus, the dependability of a discriminator circuit in certain applications is severely hampered. A solution to this problem is contemplated by the invention, however, and resides in discriminating at two distinct levels, one corresponding to a selected minimum absolute magnitude of combined intelligence and reference signals, and the other to a selected maximum value of reference signal. As a result, a completed output signal of the discriminator circuit is not effected unless an input signal of sufficient absolute magnitude to trigger the circuit, also has sufficient relative magnitude to return to the selected maximum value of reference signal.

Therefore, further objects of the invention are to provide new and improved discriminator circuits wherein an input signal is discriminated at two levels, one corresponding to a selected minimum absolute magnitude of input signal and the other corresponding to a selected maximum value of reference signal. Another object of the invention is to provide a bilevel discriminator circuit for discriminating both at a selected minimum absolute magnitude of input signal and at a selected maximum value of reference signal, wherein the bilevel discrimination is effected by introducing hysteresis between the energizing and deenergizing levels of the circuit, and wherein the hysteresis is adjustable to accommodate various values of absolute magnitude and reference signal.

A still further object of the invention is to provide new and improved bilevel discriminator circuits wherein a pair of triodes in a bistable multivibrator trigger circuit are biased to introduce hysteresis between the normal energizing and deenergizing levels of a nonconducting one of the triodes after it has become conductive, such that an input signal must not only have sufficient absolute magnitude to energize the circuit at the normal threshold level, but must also have a value of reference signal which is less than the normal energizing level by the amount of the bias, in order to return to the selected maximum value of reference signal and effect a completed output signal from the trigger circuit.

The above and other objects are accomplished in accordance with the invention by signal-stabilized electrical signal-generating and discriminating apparatus. Such apparatus includes an electrical signal source operable to produce combined electrical signals consisting of a reference signal and an intelligence signal. The intelligence signal causes a differential amplifier to provide a corresponding amplified output signal. The amplifier is also responsive to the combined signals and to a fixed input signal to produce complementary signals which can be monitored to detect variations in the reference signal. A discriminator circuit, responsive to the output signal of said amplifier, provides an output signal only in response to a signal attaining a selected absolute magnitude and returning to a selected value of reference signal. Means are provided for controlling the signal source by adjusting the reference signal to the selected value to restore the complementary signals of the amplifier to a predetermined normal relationship when the source output consists of the reference signal alone.

A preferred signal-stabilized signal-generating system includes a scintillation detector system sensitive to radiation flux so as to produce combined electrical signals consisting of a reference electrical signal and an intelligence signal. A differential amplifier, responsive to the output signal of the detector system and to a fixed signal for producing complementary signals, is operative normally in a balanced condition when the detector output consists of the reference signal alone and such signal remains at a selected value, the fixed input signal being maintained at such selected value to control one of the complementary signals. The amplifier also amplifies the intelligence signal to provide a corresponding output signal. The reference signal of the detector system is stabilized by means sensitive to an unbalanced condition in said amplifier when under the influence of the reference signal alone, which means controls the detector system by adjusting the reference signal to the selected value, thereby to balance the amplifier and to compensate for drift in the reference signal of the detector system.

A preferred bilevel discriminator circuit includes a conventional pulse-height discriminator circuit normally energizable and deenergizable in response to an input signal of selected absolute magnitude to provide an output pulse, the input signal comprising combined signals consisting of pulses superimposed on a reference electrical signal. In accordance with the invention, biasing means are arranged to provide hysteresis between the energizing and deenergizing levels of the circuit. The biasing means may be adjusted such that one of the levels corresponds to a selected minimum absolute magnitude of combined input signal and the other corresponds to a selected maximum value of reference signal, whereby an output pulse may be effected only for a prescribed minimum magnitude of input pulse superimposed on a prescribed maximum value of reference signal.

In a preferred embodiment of the signal-stabilized radiation measuring and discriminating apparatus, the scintillation detector system is sensitive to an intermittently varying radiation flux. The detector system generates an electrical reference signal corresponding to a normal level of flux intensity, and an intelligence signal corresponding to the change in flux intensity for each intermittent variation with respect to the normal flux intensity, each of the signals being established by the number of pulses per unit of time produced in response to the radiation flux. Further, the differential amplifier is operative normally in a balanced condition between variations in flux intensity.

Variations of the reference signal from the selected value between variations in flux intensity causes imbalance of the amplifier and monitoring means sense such imbalance and operate to control the detector system to readjust the reference signal to the selected value and thereby balance the amplifier. Consequently, the control means may compensate for drift in the detector system between variations in flux intensity, and the bilevel discriminator circuit may negate false signals resulting from drift in the detector system during variations in the flux intensity.

Other objects, advantages, and aspects of the invention will appear from the following detailed description of a preferred embodiment thereof when taken in conjunction with the appended drawings in which:

FIG. 1 is a perspective view of an industrial application in which a specific embodiment of the invention may be utilized;

FIG. 2 is a block diagram illustrating generally the combination of a scintillation detector system and discriminating circuit utilized in the industrial application depicted in FIG. 1;

FIG. 3 is an electrical diagram depicting the details of the preferred combination of the detector system and the discriminator circuit illustrated generally in FIG. 2;

FIG. 4 is an electrical diagram of the preferred discriminator circuit embodied in the combination depicted in FIG. 3;

FIG. 5 is an electrical diagram depicting an alternative embodiment of a bilevel discriminator circuit; and FIG. 6 is a pulse diagram illustrating the effect of a hysteresis adjustment in a discriminator circuit with respect to an input pulse thereto.

The present invention encompasses many embodiments which may be effective individually as units or in combination with each other. As it is believed that the various embodiments can best be understood in the environment of an industrial application, such an application will first be described to facilitate a better understanding of the various embodiments in a preferred combination, and the embodiments will subsequently be described individually for a complete understanding of the invention.

The industrial application contemplated involves the detection of the presence of a metallic insert within a shell of a connector for insulated conductors, of the type disclosed in U.S. Patent No. 3,064,072 issued to H. J. Graff et al. on November 13, 1962, and for deflecting only those connectors containing such an insert into a hopper for acceptable parts. With reference to FIG. 1, the connectors 10—10 are initially fed by a syntron vibratory feeder 11 to a slide 12, disposed at a downward angle with respect to the feeder 11, and onto a belt conveyor 13 moving in the direction indicated by the arrow X.

The connectors 10—10 on the belt conveyor 13 are closely spaced and it is desired that successive connectors be spaced apart by about their length, for purposes to be disclosed hereinbelow. To this end, a second slide 14 is disposed at the end of the conveyor 13 so that the connectors 10—10 slide onto a second belt conveyor 16 moving in the direction indicated by the arrow Y. The desired spacing between successive connectors is achieved by adjusting the relative speeds of the two conveyors 13 and 16 so that the conveyor 16 moves at a linear speed approximately twice as great as that of the conveyor 13, thereby to provide a spacing of about one connector between successive connectors.

Gamma radiation of low energy emitted from a source 17 (for example, americium 241) disposed beneath the conveyor 16, is directed through each passing connector 10 to a scintillation detector system 18 disposed thereabove. The radiation flux is attenuated with respect to a normal level of flux intensity by each connector passing therethrough, the degree of attenuation being significantly dependent upon the presence or absence of an insert within the connector. Thus, such intermittent attenuations or variations from the normal flux intensity provide an indication as to the presence or absence of an insert within a passing connector 10.

When the radiation is sufficiently attenuated as to indicate the presence of an insert, an air gun 19 is actuated with a negligible time delay to deflect the connector with a blast of air from a nozzle 21 into a hopper 22 for acceptable parts. When the amount of attenuation indicates the absence of an insert, however, that connector passes the air gun 19 undeflected, and falls into a hopper 23 for unacceptable parts. The apparatus is, therefore, fail safe inasmuch as positive action is required in order to accept a part.

Each variation in the normal flux intensity due to attenuation by a passing connector, gives rise to a change in the number of scintillations in the detector phosphor 24. A photomultiplier tube 26 responsive to scintillations in the phosphor 24, is initially adjusted to generate a reference electrical signal in response to the normal level of flux intensity. In response to each attenuation of the radiation flux, an intelligencee signal is generated corresponding in magnitude to the change in flux intensity. Both signals are established by electrical pulses produced by the photomultiplier 26 in response to the radiation flux, the number of pulses per unit of time being inversely proportional to the intensity of the flux. Therefore, a connector having an insert therewithin is distinguished from a connector not having one, in that the former gives rise to a substantially greater number of pulses per unit of time than the latter.

Referring now to the block diagram illustrated in FIG. 2, the reference signal of the detector 18 is determined by a high voltage power supply 27 which is adjustable to vary the gain of the photomultiplier (included as part of the scintillation detector 18 in FIG. 2) by varying the voltage supplied thereto. The output of the detector 18 is fed to a differential amplifier 28 which is influenced by the average number of input pulses per unit of time, representative of the reference and intelligence signals, to provide an amplified output signal corresponding to the radiation intensity. The differential amplifier 28 produces complementary signals in response to the detector output signal and to a fixed signal, and operates normally in a balanced condition when the detector output consists of the reference signal alone and such signal remains at the selected value, the fixed input signal being maintained at such selected value to control one of the complementary signals. The differential amplifier becomes unbalanced, however, when the reference signal drifts from the selected value.

A servo-amplifier 29 is sensitive to the complementary signals of the differential amplifier 28 and is operable to control the high voltage power supply 27 to correct an unbalanced condition in the differential amplifier 28. Since the detector output signal consists of the reference signal alone between each intelligence signal caused by a passing connector 10, the servo-amplifier 29 can then determinne whether the reference signal corresponds to a selected value by sensing an unbalanced condition in the differential amplifier 28. Then, by varying the voltage applied to the photomultiplier 26, the servo-amplifier 29 readjusts the reference signal to the selected value to restore the differential amplifier to balanced condition again.

The amplified output signal of the differential amplifier 28 is fed to a discriminator circuit 31 which provides an output pulse for only those input signals attaining a selected minimum absolute magnitude and returning to a selected maximum value of reference signal. When the discriminator 31 is triggered by such an input signal, it provides a completed output signal which energizes an actuator 32 which in turn energizes the solenoid 33 for the air gun to deflect the connector 10 into the hopper 22 for acceptable parts.

Turning now to FIG. 3 for the details of the electrical circuitry, the output signal of the photomultiplier 26 is fed through the shielded conductor 34 to a filtering network 36 composed of a capacitor 37 and a resistor 38 connected in parallel to ground. The filtering network 36 averages the number of overlapping pulses per unit of time to provide either the reference signal or intelligence signal, depending upon the level of flux intensity, and the grid 39 of one of a pair of triodes 41 and 42 forming the differential amplifier 28 is influenced only by such average.

The differential amplifier 28 is designed to produce complementary signals, in that the cathodes 43—43 of the triodes 41 and 42 are connected in common through a constant current source 44 to a —300 volt line 45, and the anodes 46 and 47 thereof are connected through equal resistances 48—48 to a +300 volt line 49. Thus, in response to a fixed input signal and the output signal of the detector system, the currents conducted by the triodes 41 and 42 are complementary. The differential amplifier is adjusted to operate normally in a balanced condition when the output signal of the detector system 18 consists of the reference signal alone by controlling the complementary signal of the triode 42 with the fixed input signal, which is maintained at a selected value of the reference signal. This fixed input signal is established by biasing the grid 51 of the triode 42 through a potential divider 52 connected between ground and the —300 volt line 45 such that the bias on the grid 51 corresponds to the selected value of the reference signal, for example —2 volts.

It is apparent, therefore, that if the reference signal alone is applied to tthe grid 39 of the triode 41 and if it corresponds to the selected value, the triodes 41 and 42 will conduct equally and the differential amplifier will operate in a balanced condition. Thus, with such an arrangement, a means may be provided for readily detecting any drift in the value of the reference signal, as such drift will be reflected by an unbalanced condition in the differential amplifier. Since, as pointed out above, the reference signal alone is generated by the detector system 18 in the absence of a passing connector 10, a balancing means may be conveniently arranged to sense an unbalanced condition in the differential amplifier 28 during such intervals and to control the reference signal of the detector system accordingly to compensate for any drift therein.

Such a balancing means is provided by connecting a conventional servo-amplifier 29, such as a Brown Electronik Continuous Balancing Unit marketed by Minneapolis Honeywell Regulator Company, across the anodes of the differential amplifier 28. The conductors 53 and 54 may be utilized to connect the servo-amplifier 29 to the anodes 46 and 47 of the triodes 41 and 42, respectively, to sense whether or not the anodes have equal potentials when the grid 39 is under the influence of the reference signal only, indicating conduction of equal currents. Means are described below for connecting the servo-amplifier to the anodes of the differential amplifier only during the intervals between passing connectors 10—10.

In response to unequal potentials of the anodes 46 and 47, indicating an unbalanced condition of the differential amplifier 28, the servo-amplifier 29 automatically controls the high voltage power supply 27 to correct such imbalance. This is accomplished by varying the voltage applied to the photomultiplier 26 so as to readjust the reference signal to the selected level, thereby causing the triodes 41 and 42 to conduct equally again.

Each intermittent interruption of the reference signal by an intelligence signal in response to a passing connector 10, unbalances the differential amplifier 28 by causing the triode 41 to conduct more heavily than the triode 42. This causes the potential of the anode 47 to increase abruptly, the magnitude of increase being dependent upon the decrease in the intensity of the radiation flux. Thus, an output taken at the anode 47 of the triode 42 is representative of the intelligence signal produced in response to the change in flux intensity, with an amplification of for example 10 to 1. Following the termination of the intelligence signal, the differential amplifier 28 resumes its balanced condition, and an amplified output signal is thereby completed as the anode decreases in potential to the balanced value.

As a result of the above arrangement, a signal-stabilized scintillation detector system is provided which may be advantageously utilized in conjunction with most conventional discriminator circuits. Because the reference signal of the detector system can be selectively monitored, the reference signal may be stabilized at a selected value to compensate for drift therein, and accurate measurements of radiation intensity may thus be provided. Since this resolves the basic disadvantage in prior art scintillation detector systems, as well as other detector systems, such systems may now be used in many applications where they are advantageous and where they could not be used before.

The above signal-stabilized detector system may be utilized even more advantageously with a preferred discriminator circuit having the capability of discriminating at two distinct levels for each input pulse. The amplified signal provided by the differential amplifier 28 is fed through a high-pass filter 55, including a resistor 56 and a capacitor 57, to the grid 58 of a bistable multivibrator trigger circuit 59. The trigger circuit 59 includes a pair of triodes 61 and 62 which are alternately conductive, the grid 63 of the triode 62 being biased through a regenerative feed back circuit 64. The feed back circuit 64 consists of a high-pass filter, including a capacitor 67 and a resistor 68, through which the potential of the anode 66 of the triode 61 is fed back to influence the grid 63 accordingly.

The grid 58 of the triode 61 is biased through a voltage divider 69 connected to the —300 volt line 45 so that the triode 61 is normally in a nonconductive state. The anode 66 of the nonconductive triode 61 is conventionally connected through a resistor 70 to the +300 volt line 42. When the triode 61 is nonconductive, the potential of the anode 66 is +300 volts, since there is no voltage drop across the resistor 70, which potential in turn is applied to the grid 63 of the triode 62 through the regenerative feed back circuit 64 so that the triode 62 is normally conducting. Current is thus conducted by the triode 62 through a resistor 71 connecting its anode 72 to the +300 volt line 49, the cathode 73 thereof being connected in common with the cathode 74 of the nonconducting triode 61 through resistances 76—76 to the —300 volt line 45.

The bias applied to the grid 58 of the triode 61, established by the voltage divider 69, is adjusted so that an input signal representative of an acceptable connector is of sufficient absolute magnitude to energize the trigger circuit 59, whereas an input signal indicative of an unacceptable connector is not. This is conventionally accomplished by biasing the grid 58 so that the firing and cutoff potentials of the triode 61 correspond to a level generally midway between the absolute magnitude of signal representative of an acceptable connector and that of an unacceptable connector. An amplified input signal corresponding to an acceptable connector 10 thus excites the nonconducting triode 61 to a conductive state wherein the potential of the anode 66 decreases rapidly and forces the grid 63 of the normally conducting triode 62 below the cutoff potential of that triode, causing it to become nonconductive.

When the amplified input signal decreases in magnitude again below the cutoff potential of the triode 61, that triode ceases to conduct, and the abrupt increase in potential of the anode 66 raises the potential of the grid 63 above the firing potential of the normally conducting triode 62, thereby causing it to become conductive again. An output pulse, taken for example at the anode 72 of the triode 62, is provided only for an input signal representative of an acceptable connector, which signal energizes and deenergizes the trigger circuit 59 to respectively increase and decrease the potential of the anode 72 to form such output pulse. In this manner, the bistable multivibrator trigger circuit 59 operates as most conventional pulse height discriminator circuits to discriminate only for absolute magnitude of input signal.

In order to protect against false input signals which, because of an upward drift in the reference signal, enable an input pulse representative of an unacceptable connector to attain the discriminating level of absolute magnitude, a hysteresis adjustment is provided in the trigger circuit 59. Such an adjustment is designed to introduce hysteresis between the normal firing and cutoff potentials of the normally nonconducting triode 61 after it has been rendered conductive. It is desired that the cutoff potential of the triode 61 be lowered relative to the normal firing potential thereof by an amount corresponding to the difference in potential between a desired minimum absolute magnitude of input pulse, indicating a connector with a shell therewithin, and a selected maximum value of the reference signal.

Reference is made to FIG. 6, wherein a pulse A indicative of an acceptable connector is shown superimposed on a reference signal R, with a pulse B indicative of an unacceptable connector shown adjacent thereto. The firing potential X and cutoff potential Y are substantially at the same levels in conventional discriminator circuits and are depicted as such with respect to pulse A. As was pointed out above, the firing and cutoff potentials in conventional discriminators are usually adjusted to a level midway between the magnitude of a good pulse A and a bad pulse B for proper discrimination.

By introducing the specified hysteresis, the cutoff potential is effectively decreased to a selected value of reference signal R' as is indicated at Y' with respect to a good pulse C. The amount of hysteresis introduced (the difference in potential between the normal firing potential X and the biased cutoff potential Y') corresponds to the minimum relative magnitude a pulse must have with respect to the selected absolute magnitude (firing potential X) in order to return to the selected value of reference signal (cutoff potential Y').

As a result, an input pulse must not only attain the minimum absolute magnitude corresponding to the firing potential X, but must also have sufficient relative magnitude to return to the selected maximum value of reference signal in order to reach the cutoff potential Y' and effect a completed output pulse by energization and deenergization of the trigger circuit 59. Such bilevel discrimination precludes triggering of the circuit 59 by a false input pulse, since a bad pulse D which attains the minimum absolute magnitude of firing potential X as a result of an upward drift in the value of the reference signal R from the selected value R', will not have sufficient relative magnitude to return to the cutoff potential Y' corresponding to the maximum value of reference signal, and a completed output pulse will not be effected.

Thus, with such hysteresis, a pulse representative of a connector 10 having no insert therein may fire the triode 61 as a result of an upward drift in the reference signal, but there will not be a sufficient decrease in absolute magnitude at the termination of such a pulse to swing the grid 58 of the triode 61 below the biased cutoff potential. Thus, a completed output pulse is not effected from the anode 72 of the triode 62 since the normally nonconducting triode 61 will continue to conduct, forcing the normally conductive triode 62 through the feed back circuit 64 to continue in a nonconductive state.

A preferred circuit for providing such a hysteresis adjustment, illustrated in FIGS. 3 and 4, incorporates a voltage divider 70' in the anode circuit of the normally nonconducting triode 61. The voltage divider 70' effects no change in the initial conditions of the triodes 61 and 62, since the triode 61 is initially nonconductive and thus the anode 66 of that triode 61 is at the full +300 volts potential regardless of the voltage divider. The normal firing potential of the triode 61 is, therefore, unaffected by the voltage divider 70' and the triode fires in response to any input pulse attaining an absolute magnitude corresponding to such firing potential X.

However, when the non-conducting triode 61 becomes conductive the voltage divider 70' lowers the potential of the anode 66 below its normal potential in a conductive state by increasing the resistance in the anode circuit above the normal resistance therein. The voltage divider 70' is adjusted with the nonconducting triode 61 in a conductive state to decrease the anode potential, relative to the normal level thereof during conduction, such that only if the input pulse has sufficient relative magnitude to return to the selected value of reference signal, will the anode potential increase to its normal level as the triode 61 starts to become non-conductive again.

The hysteresis so imposed does not result from the immediate effect of the decreased anode potential on the normally nonconducting triode 61, but rather results from its immediate effect on the normally conducting triode 62. The decreased anode potential results in a potential more negative than the normal feed back being applied through the feed back circuit 64 to the grid 63 of the normally conducting triode 62. The resulting decrease in the potential of the grid 63 inhibits the normal regenerative effect of the feed back circuit 64 on the triode 62. Only when an input signal returns to the selected value of reference signal, will the anode potential of the triode 61 increase to its normal unbiased level during conduction and thereby increase the potential of the grid 63 of the normally conducting triode 62 to the firing potential thereof so that regeneration may commence.

Consequently, a false input pulse which causes the nonconducting triode 61 to conduct, may begin cutoff of the triode 61 as the pulse terminates, but will be of insufficient relative magnitude to commence regeneration of the normally conducting triode 62 and a completed output pulse will not be effected. Therefore, a completed output pulse, resulting from energization and deenergization of the trigger circuit 59, will be effected only for prescribed input pulses superimposed on a selected maximum value of reference signal.

It is apparent, therefore, that by combining the preferred signal-stabilized scintillation detector system with the bi-level discriminator circuit, very accurate measurements, and therefore, accurate selection of good parts, may be effected. The signal-stabilized scintillation detector system, with the balancing servo-amplifier, may be utilized to maintain the reference signal of the scintillation detector substantially constant at a selected value between variations in the radiation flux. The detector system has the limitation, however, that the output signal cannot be monitored during a signal produced in response to a passing connector 10 since the intelligence signal rather than the reference signal alone, would influence the balancing servo-amplifier, and the intelligence signal rather than the reference signal would be adjusted to the selected value.

To compensate for drift in the reference signal at such times as the servo-amplifier 29 does not monitor the reference signal (normally just prior to and during variations in the flux intensity) the bistable discriminator circuit 59 is effective to provide a completed output pulse only for pulses attaining at least the selected absolute magnitude, superimposed on a reference signal having a value less than the selected maximum value. To recapitulate, this is accomplished by the hysteresis adjustment which permits discrimination against false input pulses wherein a bad pulse D (FIG. 6), as the result of drift in the reference signal, attains sufficient absolute magnitude to energize the trigger circuit 59. Since such false input pulses have insufficient relative magnitude to return to the maximum value of reference signal, the discriminator circuit will not be deenergized and a completed output pulse will not be effected therefor.

Specifically, by utilizing the deenergizing portion of an output pulse from the discriminator circuit as the actuating signal, the discriminator circuit will be ineffective to provide an actuating signal in response to a false input signal since, while it may energize the circuit, it will not deenergize the circuit. Consequently, only input pulses attaining at least the selected minimum absolute magnitude and returning at least to the selected maximum value of reference signal will be effective to provide an actuating signal from the discriminator circuit.

To provide the desired actuation of the air gun 19 in response to an acceptable connector 10, the output pulse from the discriminator circuit 59 is fed to the grid 77 of a triode 78, which is normally nonconductive under the influence of the anode potential of the triode 62. The grid 77 is biased through resistors 79 and 80 so that such pulse renders the triode 78 conductive through an anode resistor 81 from the +300 volt line 49 and a cathode resistor 82 to ground. The output pulse of the discriminator circuit 59 is inverted by taking an output from the anode of the triode 78. The resulting pulse is fed through a differentiating circuit arranged so that on the negative-going leg of the pulse, current is conducted through a capacitor 83, a diode 84, and through a small resistor 86 to ground, while on the positive-going leg of the pulse, the direction of current flow is reversed and the diode 84 forces current to pass through a higher resistance 87 connected in parallel therewith.

In this manner, two different time constants are effected. The initiating negative-going leg of the pulse gives rise to a sharp decrease in potential across the resistor 86 and a fast build up of charge across the capacitor 83 since the time constant is small as a result of the small resistance 86. The terminating positive-going leg of the pulse, however gives rise to a rapid increase in the potential across the resistor 87 and a slow build up of charge on the capacitor 83, because of the large resistance 87 and resulting greater time constant. This rapid increase in potential across the resistor 87 and the larger time constant are utilized to bias a grid 88, connected at a point 89 between the capacitor 83 and the resistor 87, to cause a triode 90 to conduct and energize a relay K1 in the anode circuit thereof.

The energization of the relay K1, which is a mercury-wetted relay, closes normally open contacts K1-1 to complete a circuit through conductors 91 and 92 to energize the air gun solenoid 33. This actuates the air gun 19 to deflect the acceptable connector into the hopper 22. The energization of relay K1 also closes contacts K1-2 to complete a circuit through a low-pass filter including a resistor 93 and a capacitor 94, to the grid 95 to a triode 96 to render it momentarily conductive. The triode 96 is normally non-conductive under the influence of a bias applied through resistance 97, and when rendered conductive by the closing of contacts K1-2, it energizes a relay K2 so as to close normally open contacts K2-1 to connect the balancing servo-amplifier 29 to the anodes 48 and 49 of the differential amplifier 28.

At such time, the amplifier 28 is influenced only by the reference signal because of the spacing between connectors 10, and the servo-amplifier 29 may correct imbalance in the differential amplifier 28 by controlling the high voltage power supply 27 to adjust the reference signal to the selected value. The time constant of the resistors 93 and 97 coupled with the capacitor 94, is determinative of the time duration of conduction by the triode 96 and is designed to provide a predetermined time delay in the cutoff signal to such triode. This time delay is sufficient to enable the servo-amplifier 29 to sense imbalance and adjust the reference signal before it is disconnected again by deenergization of the relay K2. Thus, upon re-opening of the contacts K2-1, the reference signal has been stabilized and the circuit is prepared for the next succeeding connector.

It is to be emphasized that it is the terminating leg of the output pulse from the discriminating circuit 59 which energizes the relay K1. This result obtains since it is the terminating leg of the output pulse from the triode 78 which biases the triode 90 to a conductive state to energize the relay K1. Therefore, unless a complete output pulse is effected by the discriminating circuit 59, the relay K1 will not be energized and the air gun 19 will not be actuated to deflect the connector into the hopper 22 for acceptable parts.

It is also to be noted that in this preferred application, the balancing servo-amplifier 29 is not connected to monitor the differential amplifier 28 after each passing connector and it is not connected for the total duration of the interval between connectors. This is purely a matter of preference, and may be varied to suit the needs of the particular application. In this preferred application, the acceptable connectors greatly outnumber the defective connectors, and thus the frequency with which the balancing servo-amplifier 29 monitors the differential amplifier 28 is nearly the same as if it occurred after each passing connector. Further, it was found that the servo-amplifier 29 need only be actuated for a limited time, in this case the period of time delay established by the resistors 93 and 97 and the capacitor 94, in order to fully perform the desired stabilizing of the reference signal and maintain the reference signal substantially constant at the selected level. Since the bilevel discriminator 31 compensates for drift at all times, drift in the reference signal at times when it is not monitored by the balancing servo-amplifier 29 will be effectively screened by the discriminator.

By adjusting the variations in flux intensity so as to be intermittent at regular intervals, as in their preferred application, various commercial timing devices can be coordinated with such variations to render the balancing servo-amplifier sensitive to an unbalanced condtion in the differential amplifier for the duration of every interval between variations. Where it is inconvenient to adjust the variations to regular intervals, a simple actuator device could be interposed in the circuit to deenergize a relay normally connecting the servo-amplifier to the anodes of the differential amplifier, in response to commencement of an intelligence signal from the detector system, and to reenergize the relay with the termination thereof.

While the above discriminator circuit 59 is thus advantageously utilized in this preferred application in conjunction with the signal-stabilizing scintillation detector system, it will of course be obvious that such a discriminator circuit may be utilized advantageously in any application where there is a possibility that the input signal may be affected by drift.

In accordance with another embodiment of a bistable discriminator circuit, illustrated in FIG. 5, the hysteresis adjustment may be provided by a direct bias on the grid 58 of the normally nonconducting triode 61. This may be accomplished by utilizing the conventional resistance 70 in the anode circuit of the triode 61, and providing a voltage divider 100 in the anode circuit of the normally conducting triode 62 and tapping off of the voltage divider 100 through a resistor 101 to the grid 58. With this arrangement the initial bias on the grid 58 of the nonconducting triode 61 must be adjusted through both of the voltage dividers 69 and 100 so that an input signal of the selected absolute magnitude renders the triode 61 conductive just as in conventional discriminator circuits.

As the normally conducting triode 62 discontinues conduction, however, the potential drop across the voltage divider 100 approaches zero and the anode 72 of the normally conducting triode 62 approaches the +300 line voltage. This results in a more positive bias on the grid 58 of the normally nonconducting triode 61 which may be adjusted to correspond precisely to the difference in potential between a selected minimum absolute magnitude of input pulse and a selected maximum value of reference signal.

Thus after the nonconducting triode 61 becomes conductive, hysteresis is introduced between the normal firing potential X and the cutoff potential Y so that a pulse of sufficient absolute magnitude to fire the triode 61 must also possess sufficient relative magnitude to return to the selected value of reference signal and thereby to reach the biased cutoff potential Y', in the same manner described above and depicted in FIG. 6. In this case, however, the precise amount of hysteresis is provided by initially adjusting the voltage divider 100 so that the amount that it contributes to the bias on the grid 58 of the triode 61 when it is nonconductive, will be increased precisely by the amount of hysteresis desired after the triode 61 becomes conductive.

It should be noted that when the normally conductive triode 62 is conducting, the current flow is heavy through the voltage divider 100 and the potential drop across it is rather large. When the normally nonconductive triode 61 is conducting, however, only a slight amount of current is conducted through the voltage divider 100, since the triode 62 is not conducting and since the current conducted through the voltage divider and the grid circuit of the triode 61 is very small. Thus, the tapping point 102 on the voltage divider 100 will have a potential slightly less than the +300 line voltage. Therefore, it is the difference between the potential at the tapping point 102 when the normally conductive triode 62 is conducting and its potential when the normally nonconductive triode 61 is conducting which must correspond to the desired hysteresis.

It is of course obvious that the invention also includes hysteresis adjustments incorporated in discriminator circuts responsive to negative going input signals. In such cases, the signal would be fed to the grid of a normally conducting one of the triodes and the various bias arrangements would be reversed so that the cutoff potential of the normally conducting triode corresponds to a selected minimum magnitude of input pulse, and the firing potential corresponds to a selected maximum value of reference signal in a negative direction.

For the purpose of further illustration, but without any intention of limiting the invention, reference is made to the following constants for one form of radiation detector and discriminator circuitry:

| | |
|---|---|
| Differential amplifier 28 (2) | WE420A |
| Trigger tube 59 (2) | 12AU7 |
| Actuator triode 78 | 12AT7 |
| Actuator triode 89 | 12AU7 |
| Actuator triode 96 | 12AU7 |
| Constant current triode 107 | 12AT7 |
| Diode 84 | IN93 |
| Diode 104 | IN1794 |
| Diode 119 | IN93 |
| Diode 123 | IN93 |
| Resistor 38 | 2.21 MΩ |
| Resistor 48 (2) | 511 KΩ |
| Resistor 56 | 2.21 MΩ |
| Resistor 68 | 2.21 MΩ |
| Resistor 70 | 39 KΩ |
| Resistor 70' | 25 KΩ |
| Resistor 71 | 68.1 KΩ |
| Resistor 76 (2) | 59.6 KΩ |
| Resistor 79 | 2 MΩ |
| Resistor 80 | 1.1 MΩ |
| Resistor 81 | 1.65 MΩ |
| Resistor 82 | 265Ω |
| Resistor 86 | 6.98 KΩ |
| Resistor 87 | 2 MΩ |
| Resistor 93 | 750 KΩ |
| Resistor 97 | 249 KΩ |
| Resistor 98 | 475 KΩ |
| Resistor 99 | 2 MΩ |
| Resistor 103 | 82.5 KΩ |
| Resistor 106 | 475 KΩ |
| Resistor 108 | 700Ω |
| Resistor 109 | 100 KΩ |
| Resistor 111 | 50 KΩ |
| Resistor 112 | 1 MΩ |
| Resistor 113 | 2 MΩ |
| Resistor 114 | 2 MΩ |
| Resistor 116 | 2.21 MΩ |
| Resistor 117 | 100 KΩ |
| Resistor 118 | 2 MΩ |
| Resistor 122 | 20 MΩ |
| Resistor 124 | 2KΩ |
| Condenser 37 | .0056 mf. |
| Condenser 57 | 100 μμf. |
| Condenser 67 | 100 μμf. |
| Condenser 83 | .01 mf. |
| Condenser 94 | .2 μf. |
| Condenser 105 | .1 mf. |
| Condenser 121 | .1 mf. |

While several specific embodiments are described in detail hereinabove, various modifications may be made without departing from the spirit and the scope of the invention and it is intended that all such modifications be interpreted as contemplated by the invention.

What is claimed is:

1. A signal-stabilized electrical signal-generating and discriminating apparatus, which comprises:
an electrical signal source operable to produce combined electrical signals consisting of a reference signal and an intelligence signal;
amplifying circuit means responsive to the output signals of said signal source and to a fixed signal for producing complementary signals, and operative normally with the complementary signals in a predetermined relationship when the output of the signal source consists of the reference signal alone and such signal remains at a selected value, the fixed input signal being maintained at a value corresponding to the selected value to control one of the complementary signals, said circuit means also amplifying the intelligence signal to provide a corresponding amplified output signal;
a discriminator circuit responsive to the output signal of said amplifying means to provide an output pulse in response to such signal attaining a selected absolute magnitude and returning to a selected value of reference signal; and
control means sensitive to variations from the normal condition of said amplifying means and operable when the output of the signal source consists of the reference signal alone to control said signal source by adjusting the reference signal to the selected value to restore said amplifying means to the normal condition again;
whereby said control means and said discriminator circuit may control and compensate for drift in the output signals of said signal source to stabilize the reference signal at the selected value.

2. Signal-stabilized electrical detector system and discriminating apparatus, which comprises:
a detector system operable to produce combined electrical signals consisting of a reference signal and an intelligence signal;
a differential amplifier responsive to the output signals of said detector system and to a fixed signal for producing complementary signals, and operative normally in a balanced condition when the output of the detector system consists of the reference signal alone and such signal remains at a selected value, the fixed input signal being maintained at such selected value to control one of the complementary signals, said amplifier also amplifying the intelligence signal to provide a corresponding amplified output signal;
a discriminator circuit responsive to the output signal of said amplifier to provide an output pulse in response to such signal attaining a selected absolute magnitude and returning to a selected value of reference signal; and
control means sensitive to an unbalanced condition in said amplifier and operable when the output of the detector system consists of the reference detector alone to control said signal system by adjusting the reference signal to the selected value to balance said amplifier;
whereby said control means and said discriminator circuit may control and compensate for drift in the output signals of said detector system to stabilize the reference signal at the selected value.

3. The apparatus as recited in claim 2, wherein:
said detector system comprises a radiation detector system sensitive to an intermittently varying radiation flux and operable to produce combined electrical signals consisting of a reference signal corresponding to a normal level of flux intensity and an intelligence signal corresponding to the change in flux intensity for each intermittent variation with respect to the normal level;

said differential amplifier is operative normally in a balanced condition between variations in flux intensity when the reference signal remains at the selected value; and means are provided for energizing said control means between intermittent variations in flux intensity to balance said amplifier when the output of the detector system consists of the reference signal alone;

whereby said control means may stabilize the reference signal and control drift in the output signals of said detector system between variations in the flux intensity, and said discriminator circuit may effect continuous bilevel discrimination and compensate for drift in the detector output signals during variations in the flux intensity.

4. Signal-stabilized radiation measuring and discriminating apparatus, which comprises:

a scintillation detector system sensitive to an intermittently varying radiation flux and operable to produce combined electrical signals consisting of a reference signal corresponding to a normal level of flux intensity and an intelligence signal corresponding to the change in flux intensity for each intermittent variation with respect to the normal level;

a differential amplifier responsive to the output signals of said detector system and to a fixed signal for producing complementary signals, and operative normally in a balanced condition between variations in flux intensity when the reference signal remains at a selected value, the fixed input signal being maintained at such selected value to control one of the complementary signals, said amplifier also amplifying the intelligence signal to provide a corresponding amplified output signal proportional to the change in flux intensity with respect to the normal level;

a discriminator circuit responsive to the output of said amplifier to provide an output pulse in response to such signal attaining a selected absolute magnitude and returning a selected value of reference signal; and control means sensitive to an unbalanced condition in said amplifier and operable to control said detector system, said control means being energizable to balance said amplifier by controlling the reference signal of said detector system;

means for selectively energizing said control means between intermittent variations in flux intensity when the detector output consists of the reference signal alone, so that said control means may adjust the reference signal of said detector system to the selected value to balance said amplifier;

whereby said control means may stabilize the reference signal and control drift in the output signals of said detector system between variations in the flux intensity, and said discriminator circuit may effect continuous bilevel discrimination and compensate for drift in the detector output signals during variations in flux intensity.

5. A signal-stabilized electrical signal-generating system, which comprises:

an electrical signal source operable to produce combined electrical signals consisting of a reference signal and an intelligence signal;

amplifying circuit means responsive to the output signals of said signal source and to a fixed signal for producing complementary signals, and operative normally with the complementary signals in a predetermined relationship when the output of the signal source consists of the reference signal alone and such signal remains at a selected value, the fixed input signal being maintained at a value corresponding to the selected value to control one of the complementary signals, said circuit means also amplifying the intelligence signal to provide a corresponding amplified output signal;

control means sensitive to variations from the normal condition of said amplifying means and operable when the output of the signal source consists of the reference signal alone to control said signal source by adjusting the reference signal to the selected value to restore said amplifying means to the normal condition again;

whereby said control means may control drift in the output signals of said signal source by stabilizing the reference signal at the selected value.

6. A signal-stabilized detector system, which comprises:

an electrical detector system operable to produce combined electrical signals consisting of a reference signal and an intelligence signal;

a differential amplifier responsive to the output signals of said detector system and to a fixed signal for producing complementary signals, and operative normally in a balanced condition when the output of the detector system consists of the reference signal alone and such signal remains at a selected value, the fixed input signal being maintained at such selected value to control one of the complementary signals, said amplifier also amplifying the intelligence signal to provide a corresponding amplified output signal;

control means sensitive to an unbalanced condition in said amplifier and operable when the output of the detector system consists of the reference signal alone to control said detector system by adjusting the reference signal to the selected value to balance said amplifier;

whereby said control means may control drift in the output signals of said detector system by stabilizing the reference signal at the selected value.

7. The apparatus as recited in claim 6, wherein:

said detector system comprises a radiation detector system sensitive to an intermittently varying radiation flux and operable to produce combined electrical signals consisting of a reference signal corresponding to a normal level of flux intensity and an intelligence signal corresponding to the change in flux intensity for each intermittent variation with respect to the normal level;

said differential amplifier is operative normally in a balanced condition between variations in flux intensity when the reference signal remains at a selected value; and means are provided for energizing said control means between intermittent variations in flux intensity to balance said amplifier when the output of the detector system consists of the reference signal alone;

whereby said control means may stabilize the reference signal and control drift in the output signals of said detector system between variations in the flux intensity.

8. Signal-stabilized radiation detector system, which comprises:

a scintillation detector system sensitive to an intermittently varying radiation flux and operable to produce combined electrical signals consisting of a reference signal corresponding to a normal level of flux intensity and an intelligence signal corresponding to the change in flux intensity for each intermittent variation with respect to the normal level;

a differential amplifier responsive to the output signals of said detector system and to a fixed signal for producing complementary signals, and operative normally in a balanced condition between variations in flux intensity when the reference signal remains at a selected value, the fixed input signal being maintained at such selected value to control one of the complementary signals, said amplifier also amplifying the intelligence signal to provide a corresponding amplified output signal proportional to the change in flux intensity with respect to the normal level;

control means sensitive to an unbalanced condition in said amplifier and operable to control said detector system, said control means being energizable to balance said amplifier by controlling the reference signal of said detector system; and means for selectively energizing said control means between intermittent variations in flux intensity when the detector output consists of the reference signal alone, so that said control means may adjust the reference signal of said detector system to the selected value to balance said amplifier;

whereby said control means may stabilize the reference signal and control drift in the output signals of said detector system between variations in the flux intensity.

9. The detector system as recited in claim 8 wherein:

the differential amplifier includes a pair of triodes normally operating in a balanced condition in which each conducts equally when the detector output consists of the reference signal alone and such signal corresponds to the fixed input signal at the selected value, the current flow through said triodes providing the complementary signals; and the control means comprises a servo-amplifier sensitive to the complementary current flows through said triodes and arranged to control said detector system to balance such current flows.

10. The detector system as recited in claim 8 wherein:

the scintillation detector system comprises a scintillation crystal, a photomultiplier tube responsive to scintillations in said crystal, and a high voltage power supply for operating said photomultiplier tube so as to produce the reference signal in response to the normal level of flux intensity, and the intelligence signal in response to each variation in the flux intensity;

the differential amplifier includes a pair of triodes normally operative in a balanced condition in which each conducts equally when the output of the detector system consists of the reference signal alone and such signal corresponds to the fixed input signal at the selected value, the current flow through said triodes providing the complementary signals;

the control means comprises a servo-amplifier sensitive to the complementary current flows through said triodes and arranged to control the voltage supplied to the photomultiplier tube by said high voltage power supply, said servo-amplifier being energizable to balance the complementary current flows through said triodes by adjusting the voltage supplied to said photomultiplier tube so as to return the reference signal to the selected value, thereby to stabilize the reference signal and to control drift in the output signal of said detector system.

11. In a discriminator circuit responsive to combined electrical signals consisting of input pulses superimposed on a reference signal whose magnitude is subject to drifting, and normally energizable and deenergizable at a selected absolute magnitude of input signal to provide an output pulse; the improvement for effecting bilevel discrimination of the input signal, which comprises:

biasing means arranged to provide hysteresis in said discriminator circuit by displacing relatively the energizing and deenergizing levels thereof such that one of said levels corresponds to a selected minimum absolute magnitude of combined input signal and the other of said levels corresponds to a selected maximum value of the reference signal;

whereby a complete output signal may be effected only by an input pulse of at least the prescribed minimum magnitude superimposed on a reference signal of no more than the selected maximum value.

12. A bilevel discriminator circuit comprising:

a bistable multivibrator trigger circuit responsive to combined electrical signals consisting of input pulses superimposed on a reference signal whose magnitude is subject to drifting and normally energizable and deenergizable at a selected absolute magnitude of input signal to provide an output pulse; and biasing means arranged to provide hysteresis in said trigger circuit by displacing relatively the energizing and deenergizing levels thereof such that one of said levels corresponds to a selected minimum absolute magnitude of input signal and the other of said levels corresponds to a selected maximum value of the reference signal;

whereby complete output signal may be effected only by an input pulse of at least the prescribed minimum magnitude superimposed on a reference signal of no more than the selected maximum value.

13. A bilevel discriminator circuit comprising:

a bistable multivibrator trigger circuit including a pair of triodes arranged to be alternately conductive and having a regenerative coupling, the grid of a nonconducting one of said triodes being responsive to combined electrical signals consisting of input pulses superimposed on a reference signal whose magnitude is subject to drifting, so as to render said nonconducting triode momentarily conductive when the absolute magnitude of input signal attains respectively the firing and cutoff potentials thereof, thereby to effect an output signal from said trigger circuit; and adjustable means for biasing said nonconducting triode to introduce hysteresis between the normal firing and cutoff potentials thereof such that the firing potential corresponds to a selected minimum absolute magnitude of input pulse and the cutoff potential corresponds to a selected maximum value of the reference signal;

whereby bilevel discrimination may be effected by discriminating both for minimum absolute magnitude of input pulse and for maximum value of reference signal to compensate for random drift in the input signal.

14. The discriminator circuit as recited in claim 13 wherein:

said adjustable means is operable to bias the grid of said nonconducting triode after it fires to provide the hysteresis between the firing and cutoff potentials, such that an input pulse of sufficient absolute magnitude to fire said nonconducting triode must be superimposed on a value of reference signal less than the firing potential by at least the magnitude of the hysteresis bias, in order for said nonconducting triode to resume a nonconductive condition and thereby to effect completed output pulse from said trigger circuit.

15. A bilevel discriminator circuit comprising:

a bistable multivibrator trigger circuit including a pair of triodes arranged to be alternately conductive and having a regenerative coupling, the grid of a nonconducting one of said triodes being responsive to combined electrical signals consisting of input pulses superimposed on a reference signal whose magnitude is subject to drifting, so as to render said nonconducting triode momentarily conductive when the absolute magnitude of input signal attains respectively the firing and cutoff potentials thereof, thereby to effect an output signal from said trigger circuit; and adjustable biasing means including an adjustable impedance element arranged in the anode circuit of one of said triodes and coupled to the grid of the other of said triodes to introduce hysteresis between the firing and cutoff potentials of said nonconducting triode, such that the firing potential of said nonconducting triode corresponds to a selected minimum absolute magnitude of input pulse and the cutoff potential thereof corresponds to a selected maximum value of reference signal;

whereby bilevel discrimination may be effected by discriminating both for minimum absolute magnitude of input pulse and for maximum value of reference signal to compensate for random drift in the input signal.

16. The discriminator circuit as recited in claim 15 wherein:

said adjustable means is operable to bias the grid of said conducting triode after said nonconducting triode fires, so as to retard regeneration of said normally conducting triode and thereby to provide the hysteresis between the firing and cutoff potentials of said nonconducting triode, such that an input pulse of sufficient absolute magnitude to fire said nonconducting triode must be superimposed on a value of reference signal less than the firing potential by at least the magnitude of the hysteresis bias, in order for said conducting triode to resume a conductive condition and thereby to effect completed output pulse from said trigger circuit.

References Cited by the Examiner
UNITED STATES PATENTS

| | | | |
|---|---|---|---|
| 2,750,513 | 6/1956 | Robinson et al. | 250—83.3 X |
| 2,829,268 | 4/1958 | Chope | 250—83.3 |
| 2,927,207 | 3/1960 | Fiehrer et al. | 250—83.3 X |
| 3,009,062 | 11/1961 | Brooksbank et al. | 250—71.5 X |
| 3,101,409 | 8/1963 | Fite | 250—71.5 |

RALPH G. NILSON, *Primary Examiner.*

ARCHIE R. BORCHELT, *Assistant Examiner.*